(12) United States Patent
Hufton et al.

(10) Patent No.: US 8,551,229 B2
(45) Date of Patent: Oct. 8, 2013

(54) GAS PURIFICATION BY ADSORPTION OF HYDROGEN SULFIDE

(75) Inventors: Jeffrey Raymond Hufton, Fogelsville, PA (US); Timothy Christopher Golden, Allentown, PA (US); Robin Joyce Maliszewskyj, Middletown, MD (US); Edward Landis Weist, Jr., Macungie, PA (US); Robert Quinn, Macungie, PA (US); Erin Marie Sorensen, Allentown, PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 0 days.

(21) Appl. No.: 13/476,448

(22) Filed: May 21, 2012

(65) Prior Publication Data

US 2013/0125756 A1    May 23, 2013

Related U.S. Application Data

(62) Division of application No. 12/174,706, filed on Jul. 17, 2008, now Pat. No. 7,909,913, which is a division of application No. 13/042,879, filed on Mar. 8, 2011, now Pat. No. 8,197,580.

(51) Int. Cl.
*B01D 53/02* (2006.01)

(52) U.S. Cl.
USPC .................. 96/121; 96/110; 96/134; 96/140; 95/96; 95/136; 95/139; 95/148

(58) Field of Classification Search
USPC ............... 95/96, 136, 139; 96/110, 121, 134, 96/140
See application file for complete search history.

(56) References Cited

U.S. PATENT DOCUMENTS

| | | | |
|---|---|---|---|
| 2,813,010 | A | 11/1957 | Hutchins |
| 2,818,323 | A | 12/1957 | Haensel |
| 4,061,476 | A | 12/1977 | Holter et al. |
| 4,241,032 | A | 12/1980 | Werner et al. |
| 4,276,057 | A | 6/1981 | Becker et al. |
| 4,324,564 | A | 4/1982 | Oliker et al. |
| 4,333,744 | A | 6/1982 | Fuderer |
| 4,375,363 | A | 3/1983 | Fuderer |
| 4,414,191 | A | 11/1983 | Fuderer |
| 4,553,981 | A | 11/1985 | Fuderer |

(Continued)

FOREIGN PATENT DOCUMENTS

| | | |
|---|---|---|
| CN | 1467014 | 1/2004 |
| CN | 101031350 | 9/2007 |

(Continued)

OTHER PUBLICATIONS

Quinn, R.; "Ion Exchange Resins as Reversible Acid Gas Absorbents;" Sepparation Science and Technology; vol. 38, No. 14; (2003); pp. 3385-3407.

(Continued)

*Primary Examiner* — Christopher P Jones
(74) *Attorney, Agent, or Firm* — Willard Jones, II

(57) ABSTRACT

Hydrogen sulfide is removed from a hydrogen rich gas stream using adsorbents having a low loss of carbon dioxide adsorption capacity upon sulfur loading including high purity silica gels, titania or highly cross-linked, non-chemically reactive resins. The adsorbents may be used to adsorb both carbon dioxide and hydrogen sulfide, or may be used as a guard bed upstream of a separate carbon dioxide adsorbent.

1 Claim, 11 Drawing Sheets

(56) References Cited

U.S. PATENT DOCUMENTS

| | | |
|---|---|---|
| 4,578,214 A | 3/1986 | Jungerhans |
| 4,696,680 A | 9/1987 | Ghate et al. |
| 4,813,980 A | 3/1989 | Sircar |
| 4,968,502 A | 11/1990 | Radel |
| 5,190,908 A | 3/1993 | Audeh et al. |
| 5,203,888 A | 4/1993 | Maurer |
| 5,536,300 A | 7/1996 | Reinhold, III et al. |
| 5,718,872 A | 2/1998 | Khanmamedov |
| 5,797,979 A | 8/1998 | Quinn |
| 5,895,769 A | 4/1999 | Lai |
| 6,210,466 B1 | 4/2001 | Whysall et al. |
| 6,814,786 B1 | 11/2004 | Zhuang et al. |
| 6,908,497 B1 | 6/2005 | Sirwardane |
| 7,306,651 B2 | 12/2007 | Cieutat et al. |
| 2001/0009125 A1 | 7/2001 | Monereau et al. |
| 2002/0010093 A1 | 1/2002 | Monereau et al. |
| 2003/0221555 A1 | 12/2003 | Golden et al. |
| 2004/0040565 A1 | 3/2004 | Xue et al. |
| 2004/0069146 A1 | 4/2004 | Carter et al. |
| 2005/0005770 A1 | 1/2005 | Dallas et al. |
| 2005/0139069 A1 | 6/2005 | Cieutat et al. |
| 2007/0178035 A1 | 8/2007 | White et al. |
| 2007/0232706 A1 | 10/2007 | Shah et al. |
| 2008/0031246 A1 | 2/2008 | Hasha et al. |
| 2008/0242749 A1 | 10/2008 | Van Hardeveld et al. |
| 2008/0249196 A1 | 10/2008 | Wentink |

FOREIGN PATENT DOCUMENTS

| | | |
|---|---|---|
| EP | 0486174 | 10/1994 |
| EP | 1366794 | 12/2003 |
| FR | 2836064 A1 | 8/2003 |
| FR | 2891277 | 3/2007 |
| GB | 2237814 | 5/1991 |
| WO | 2005118126 | 12/2005 |
| WO | 2006/008317 | 1/2006 |
| WO | 2006066892 | 6/2006 |

OTHER PUBLICATIONS

Izumi, J. et at; "Hydrogen Sulfide Removal with Pressure Swing Adsorption from Process Off-gas;" Proc. IVth Int. Conf. on Fundamentals of Adsorption, Kyoto; (1992) pp. 293-299.

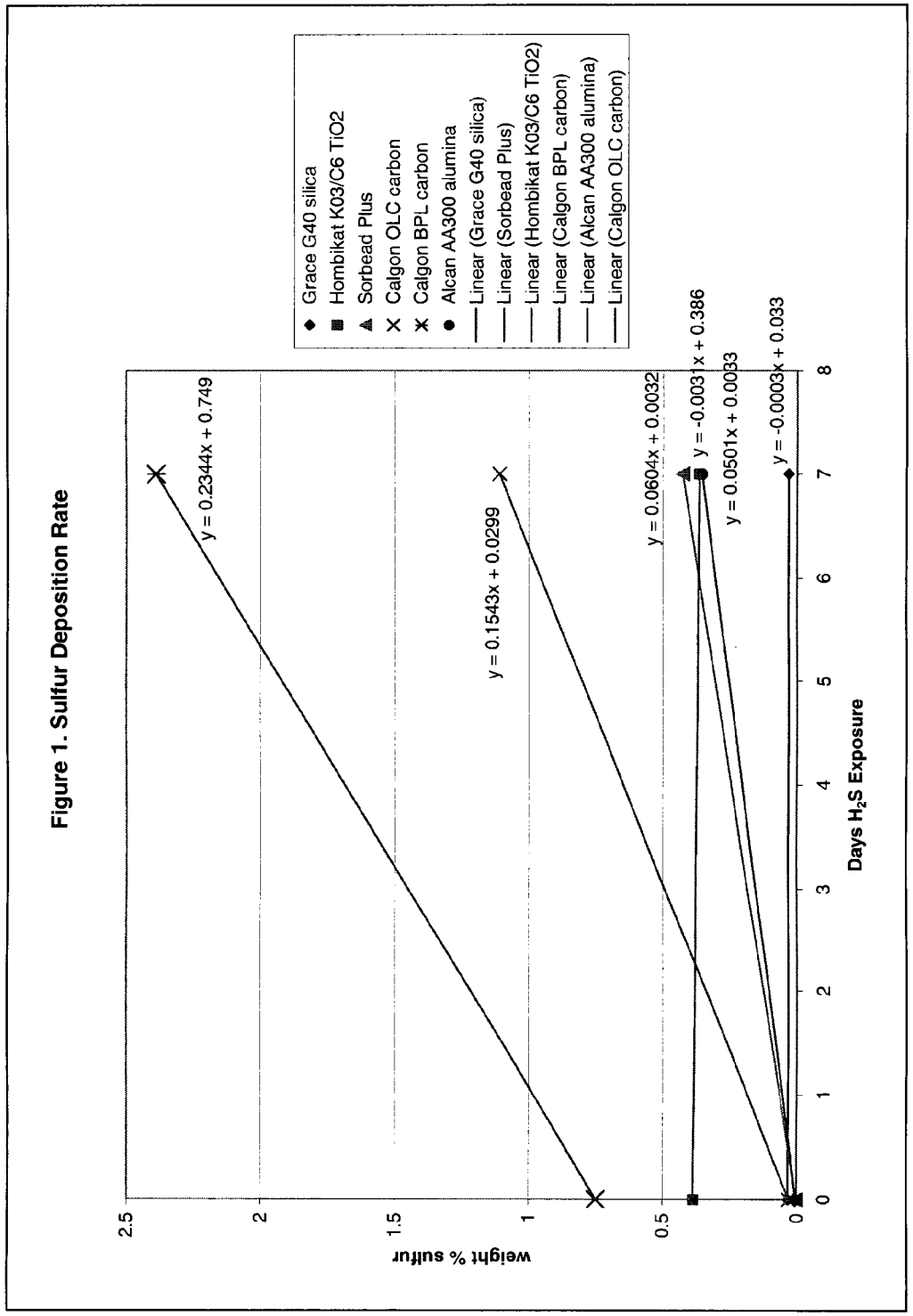

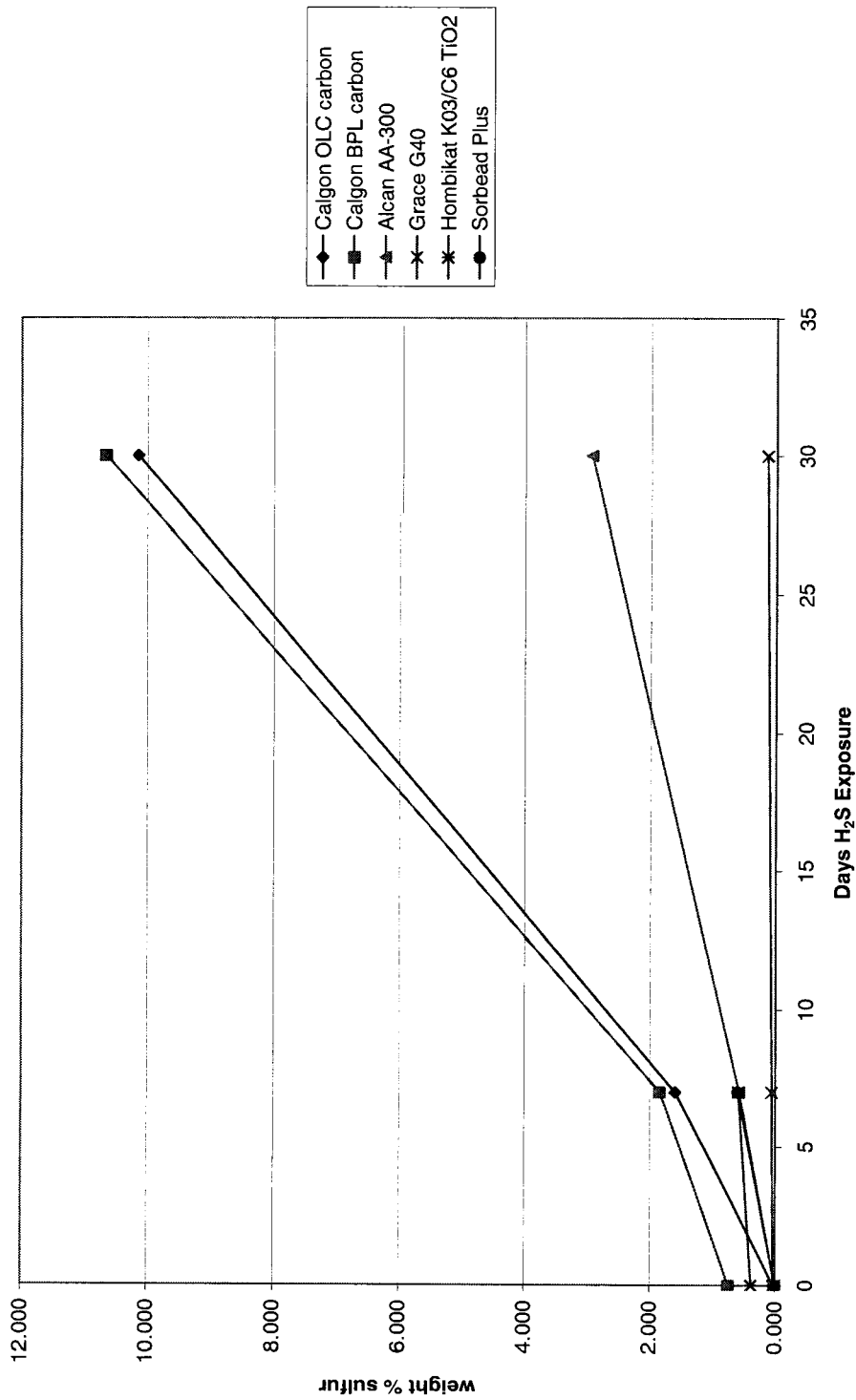

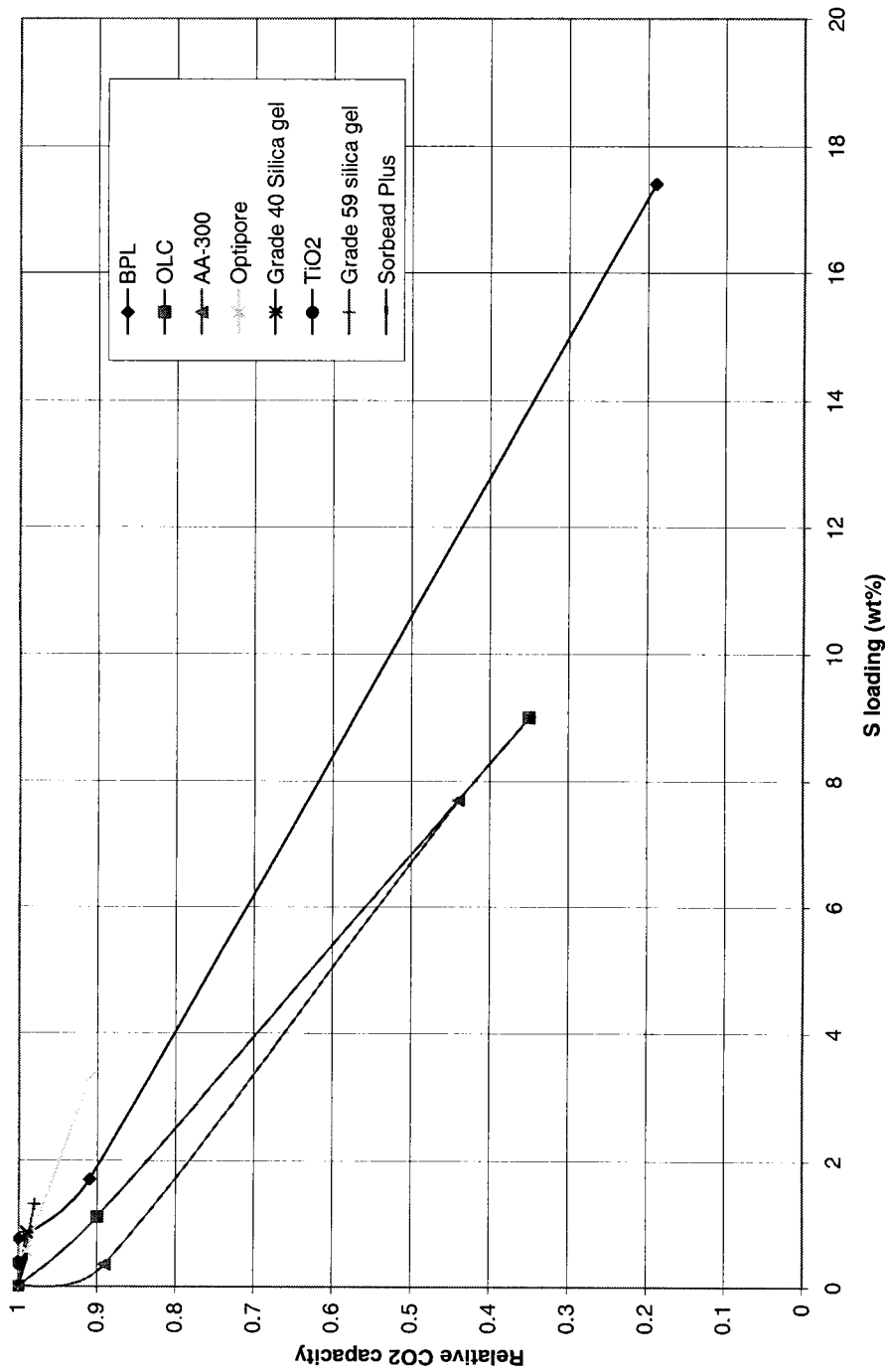
Figure 3. Reduction in CO2 capacity with S loading

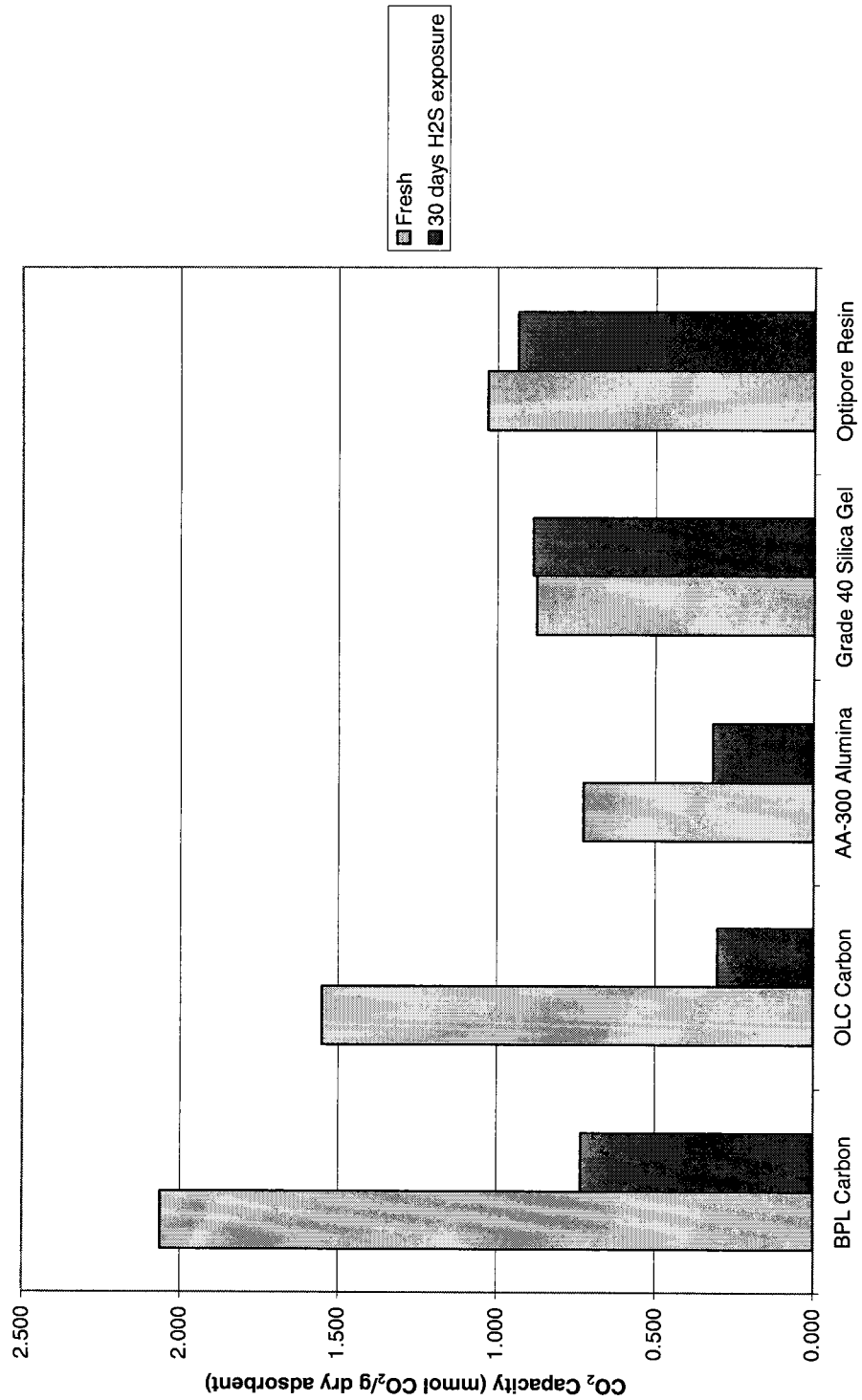

GAS PURIFICATION BY ADSORPTION OF HYDROGEN SULFIDE

CROSS-REFERENCE TO RELATED APPLICATIONS

This application is a division of application Ser. No. 13/042,879 filed Mar. 8, 2011, now U.S. Pat. No. 8,197,580, which is a division of application Ser. No. 12/174,706 filed on Jul. 17, 2008, now U.S. Pat. No. 7,909,913.

BACKGROUND OF THE INVENTION

Hydrogen production is a multi-million dollar industry supplying high purity hydrogen for chemical producing industries, metals refining, petroleum refiners and other related industries. A typical commercial source for the production of hydrogen is the reforming of natural gas or other methane-rich hydrocarbon streams. The reforming is carried out by reacting the hydrocarbon with steam and/or with oxygen-containing gas (e.g. air or oxygen-enriched air), producing a hydrogen containing gas stream with accompanying amounts of oxides of carbon, water, residual methane and nitrogen. Unless it is desired to recover carbon monoxide, it is customarily converted to carbon dioxide by water gas shift (WGS) reaction to maximize the hydrogen content in the stream. Typically, this gas stream is then purified by adsorbing impurities using a regenerable solid adsorbent, usually regenerating the adsorbent by pressure swing adsorption (PSA) in a PSA unit. The PSA vessels generally contain a layer of activated carbon, for bulk $CO_2$ removal, followed by molecular sieve for CO and $N_2$ removal. A layer of activated alumina is sometimes used at the feed end of the bed for moisture removal. Other hydrogen-rich gas sources which can be upgraded by PSA technology to a high purity product include refinery off-gases with $C_1$-$C_6$ hydrocarbon contaminants and effluent streams from partial oxidation units.

Precursors for hydrogen other than natural gas can be used for example coal, petroleum coke, biomass and other cheap precursors. The production of hydrogen from coal or petroleum coke typically would involve gasification or partial oxidation of the solid material. This gasification step combines coal, oxygen and steam at high temperature and pressure to produce a synthesis gas. The resultant synthesis gas can be treated by the water gas shift reaction ($CO+H_2O \rightleftharpoons CO_2+H_2$) to supplement hydrogen production.

The synthesis gas derived from gasification processes using coke, petroleum coke or biomass is inherently different from the synthesis gas produced by steam reforming of hydrocarbons like natural gas. In the case of steam reforming of natural gas, the resultant synthesis gas is very clean and contains a few impurities in the hydrogen-rich feed stream to the PSA. In the case of gasification-derived synthesis gas, the gas contains numerous impurities including sulfur species ($H_2S$, COS, mercaptans), metals (Hg), various chlorides, carbonyls (Ni and Fe carbonyl), arsenic, heavy hydrocarbons, ammonia, HCN, olefins, diolefins, acetylenics and aromatics. The presence of these species in the synthesis gas presents a problem for the PSA system. Some of these species like carbonyls, heavy hydrocarbons and aromatics will be very strongly adsorbing and hence difficult to desorb. If these strongly adsorbing components do not desorb during the regeneration step, the capacity of the PSA decreases and the hydrogen production rate of the PSA decreases. Other species, e.g. the sulfur species, can react with the adsorbent surface resulting in sulfur plugging of the adsorbent (and consequent loss in adsorption capacity). This is especially a problem with $H_2S$ since the concentration of this impurity in gasification-derived synthesis gas can be up to 5 vol %.

Other important aspects that need to be considered with non-natural gas derived synthesis gas are as follows. Small, unreacted amounts of oxygen may be present in the synthesis gas stream. The presence of oxygen in the synthesis gas stream greatly enhances the amount of sulfur deposition on adsorbents via the reaction $H_2S+\frac{1}{2}O_2=S+H_2O$. Also, nitrogen in significant concentrations can be present in the synthesis if air is used for the oxidation process. To produce high purity hydrogen, this nitrogen must be removed by the PSA. For this nitrogen removal step, a zeolite adsorbent is required. Since $H_2S$ is very strongly adsorbed on zeolites, care must be taken in the PSA design to ensure $H_2S$ does not reach the $N_2$-removing zeolite layer. Finally, CO removal from the synthesis gas will be required. CO removal will require a zeolite adsorbent which as in the case of $N_2$ removal must avoid contact with $H_2S$.

Gasification systems have also recently been considered for clean power production with reduced $CO_2$ emissions. The solid carbonaceous fuel is gasified to synthesis gas, shifted in a sour WGS reactor, cooled, and separated into a $CO_2$/$H_2S$ containing stream and a decarbonized $H_2$ product stream. The latter is combusted with air or oxygen-enriched air in a gas turbine to produce power with essentially $N_2$ and $H_2O$ in the vent stack. In this case, high purity $H_2$ (99.9+%) is not necessary. Generally the process goal is to remove 50-90% of the carbon species in the syngas feed—some of the carbon species can be tolerated in the product $H_2$ gas. High recovery of $H_2$ is critical for successful implementation of this approach since it impacts the solid fuel feed rate to the gasifier and hence the size of all of the equipment from gasifier to $H_2$ PSA. Integration of the separation process with the rest of the power generation process is also vital.

In most gasification to hydrogen schemes an acid gas removal system is employed prior to the PSA. This acid gas removal step (typically done by absorption with amines, cold methanol, glymes etc.) keeps $H_2S$ away from the PSA ensuring a robust system. If the gasification-derived synthesis gas could be fed directly into a PSA, then the cost and expense of the acid gas removal system could be avoided.

Typical $H_2$ PSA systems used for upgrading synthesis gas derived from natural gas will quickly lose performance over time (lower $H_2$ production rate, lower $H_2$ recovery) if used in the same way to purify gasification derived synthesis gas owing to the different impurities present.

Thus, it would be desirable to provide a robust adsorption system which can tolerate all the impurities present in gasification-derived synthesis gas.

Previous proposals for dealing with the production and purification of $H_2$ by pressure swing adsorption (PSA) from gas streams that contain significant amounts (1 vol % and higher) of sulfur containing species like $H_2S$ primarily fall into two categories: 1) art which shows that $H_2S$ and acid gases should be removed prior to the PSA and 2) art which suggests that $H_2S$ can be put directly into a PSA system, although generally without addressing specific issues relating to the stability or longevity of the process.

U.S. Pat. No. 4,553,981 teaches a process to produce high purity $H_2$ (99.9+%) from gas streams obtained by reforming of hydrocarbons, partial oxidation of hydrocarbons and coal gasification. The system consists of a synthesis generator (e.g. a gasifier), a water gas shift reactor (to convert CO and $H_2O$ to $CO_2$ and $H_2$), a liquid scrubber and a PSA system. The liquid scrubber is used to remove acid gases (like $CO_2$ and $H_2S$) from the feed stream prior to the PSA. Other references that suggest $H_2S$ removal should be accomplished prior to introduction into the PSA include U.S. Pat. No. 5,536,300; GB 2,237,814 and WO 2006/066892.

U.S. Pat. No. 4,696,680 teaches putting an $H_2S$ containing feed directly into a PSA bed. It is said that $H_2S$ can be selectively and reversibly removed from coal-derived synthesis gas using either activated carbon and/or zeolite adsorbents.

US 2002/0010093 appreciates the fact that reaction of activated carbon with $H_2S$ can occur in $H_2$ PSA processes. To obviate this, the activated carbon is acid washed prior to use. The acid washing step removes inorganic impurities which may help catalyze the formation of elemental S in the adsorbent pores. This reference also teaches a layered bed approach to $H_2$ production from an $H_2S$ containing stream which consists of a first layer of alumina or silica gel, a second layer of acid washed carbon and a final layer of zeolite.

U.S. Pat. No. 5,203,888 teaches a pressure swing adsorption process for the production of hydrogen where $H_2S$ could be present in the feed gas and that suitable adsorbents include molecular sieves, carbons, clays, silica gels, activated alumina and the like. U.S. Pat. No. 6,210,466 similarly teaches that $H_2S$ can be put directly into a PSA to produce purified methane.

EP 486174 teaches a process for producing hydrogen via partial oxidation of various hydrocarbon feedstocks (e.g. refinery off-gas). The synthesis gas produced by this process could contain high levels of $H_2S$ (up to 4 vol %). The synthesis gas produced is passed directly into a PSA for $H_2$ purification. There is no reference to the preferred PSA cycle or adsorbents required.

US 2005/0139069 teaches a process for the purification of a hydrogen stream that contains $H_2S$. The adsorbent materials cited for the application include carbon, zeolite, alumina and silica gel. The PSA is coupled with an integrated compressor for recycle of purge or residual gas to the hydrodesulfurization process.

U.S. Pat. No. 4,696,680 states as adsorbents activated carbons, zeolites, or combinations thereof. Izumi et al (Fundamentals of Adsorption; Proc. IVth Int. Conf. on Fundamentals of Adsorption, Kyoto, May 17-22, 1992) concludes that the best $H_2S$ adsorbent is silicalite or alumina.

U.S. Pat. No. 7,306,651 states that the $H_2$PSA beds should consist of at least two adsorbents chosen from activated carbons, silica gels, aluminas or molecular sieves, preferably with a protective layer composed of alumina and/or silica gel at the feed end of the bed.

U.S. Pat. No. 5,797,979 teaches the separation of $H_2S$ from gas streams using ion exchange resins. Useful materials are macroreticular anion exchange resins containing a basic anion for which the conjugate acid has a $pK_a$ value ranging from 3 to 14. Specific examples are the fluoride or acetate form of Amberlyst A26 resin. The resin contains a quaternary ammonium moiety and either fluoride or acetate counterions. A cited $H_2S$ capacity for the fluoride containing resin was 1.0 mmol/g at 25 C and 0.05 atm $H_2S$. Adsorption occurs via a chemical reaction between $H_2S$ and the basic anion as described in Sep. Sci. Tech, 38, 3385-3407 (2003). Regeneration of the $H_2S$ free adsorbent was accomplished by heating to 50 C while purging with inert gas, humidified inert gas, or dynamic vacuum.

A PSA or other swing adsorption purification of hydrogen would normally be operated using hydrogen as a purge and repressurisation gas. The beneficial use of nitrogen purge or repressurization has been proposed. U.S. Pat. No. 4,333,744 describes a 'two-feed PSA process' in which a portion of the PSA feed gas is first sent to a $CO_2$ separation unit and the $CO_2$-lean product gas is processed in the PSA followed by the remaining PSA feed gas. $N_2$ can be used as a purge gas or a repressurization gas to form an ammonia synthesis gas.

U.S. Pat. No. 4,375,363 described the use of nitrogen purge and repressurization in a typical PSA cycle to produce a nitrogen/hydrogen product used for ammonia synthesis. High pressure nitrogen is used to help displace hydrogen from the bed after the feed step, again for the production of ammonia synthesis gas. U.S. Pat. No. 4,414,191 extends this approach by utilizing a nitrogen purge step at elevated pressure, to incorporate more of the nitrogen in the $H_2$ product.

U.S. Pat. No. 4,578,214 utilized a nitrogen purged PSA unit integrated with a fuel cell system to produce ammonia synthesis gas. The fuel cell provides electrical power and supplies the source for the $N_2$ stream ($O_2$-depleted air).

U.S. Pat. No. 4,813,980 describes production of ammonia syngas via a PSA process utilizing two sets of adsorber beds, one to remove $CO_2$ and the second to remove other impurities, from a feedstock consisting of bulk $H_2$, $CO_2$, and $N_2$ and <10% other impurities. The beds of the second set are purged and repressurized with a nitrogen-containing gas. This gas could be a portion of the $N_2/H_2$ product, a recycle stream from the ammonia process, or $N_2$ obtained from other sources.

U.S. Pat. No. 4,696,680 describes the use of a guard bed for hydrogen sulfide removal upstream of a separate vessel for PSA purification of hydrogen by the removal of other impurities. The guard bed contains activated carbon, zeolites, or combinations thereof for removing both hydrogen sulfide and carbon dioxide.

WO2005/118126 teaches a bed of chemisorbent (e.g. ZnO) as a guard bed to remove $H_2S$ prior to a $H_2$PSA. The ZnO bed works by reaction of with $H_2S$ and is not a regenerable bed. Also, the $H_2S$ concentration in the feed gas in '126 is only in the ppm range because the source of $H_2$ is natural gas.

BRIEF SUMMARY OF THE INVENTION

The present invention now provides in a first aspect a process for the removal of hydrogen sulfide from a feed gas containing at least hydrogen sulfide as an impurity, said process comprising contacting the feed gas with an adsorbent for hydrogen sulfide, and adsorbing hydrogen sulfide from said feed gas to produce a hydrogen sulfide depleted feed gas, said adsorbent for hydrogen sulfide having a sulfur deposition rate of less than 0.04 wt % S per day $H_2S$ exposure when continuously exposed to a 1% $H_2S$ dry gas at 20° C. (these conditions hereinafter being implicit in the term 'sulfur deposition rate').

In an alternative aspect, the invention includes a process for the removal of hydrogen sulfide from a feed gas containing at least hydrogen sulfide as an impurity, said process comprising contacting the feed gas with an adsorbent for hydrogen sulfide, and adsorbing hydrogen sulfide from said feed gas to produce a hydrogen sulfide depleted feed gas, said adsorbent for hydrogen sulfide having an average loss of adsorption capacity for carbon dioxide upon accumulation of sulfur on the adsorbent produced by continuous seven day exposure to a 1% $H_2S$ dry gas at 20° C. of less than 2.0% capacity loss/wt % S loading, more preferably less than 1.8, still more preferably less than 1.6.

The adsorbents may be used to adsorb both carbon dioxide and hydrogen sulfide, or may be used as a guard bed upstream of a separate carbon dioxide adsorbent. As discussed above, various adsorbents for removing $H_2S$ from a gas stream such as hydrogen have been proposed, including activated carbons, aluminas and silica gel. Our studies indicate however that there are significant differences in the performance of these and other adsorbents over time. It has been found that elemental sulfur or sulfur containing compounds will accumulate in such adsorbents and will not be removed by the normal process of adsorbent regeneration in for instance a PSA process. Different adsorbents will accumulate sulfur at different rates. The accumulation of sulfur on the adsorbent will gradually decrease the capacity of the adsorbent to adsorb $H_2S$ and also its capacity to adsorb $CO_2$, which will be relevant where the bed is intended to adsorb both impurities.

This rate of sulfur deposition can be measured by passing an $H_2S$ containing feed gas continuously over an adsorbent to be tested, withdrawing a sample of the adsorbent and measuring its sulfur content and continuing the process and repeating the measurements. The $H_2S$ concentration in the gas throughout the adsorbent bed will after a relatively short time rise to the inlet concentration as the bed's capacity to adsorb $H_2S$ is exhausted. The sulfur deposition rate is then calculated by measuring the change in sulfur wt % (i.e. final S wt %–initial S wt %) divided by the days of continuous $H_2S$ exposure.

The experimental set up used is not critical, but the sulfur deposition rate is dependent on certain parameters that should therefore be standardized and controlled. In particular, it is dependent on the water content of the feed gas and the temperature. It is also dependent on the $H_2S$ concentration in the feed gas A suitable protocol is as follows. A test column is prepared containing a packed bed (e.g., 1" (2.5 cm) inside diameter×8" (20 cm) long stainless steel tube) of the adsorbent under test. Thirty to 100 grams of the adsorbent are packed into the column. A dry gas mixture containing by volume 1% $H_2S$, 8% CO, 37% $CO_2$ and balance $H_2$ is passed through the bed at 350 $cm^3$/min at 400 psig (2758 kPa) and 20° C. Samples are taken from the feed end of the adsorbent at intervals Sulfur content is measured using X-ray fluorescence analysis.

A plot of wt % sulfur against days $H_2S$ exposure may not be linear. However an average value for the sulfur deposition rate may be obtained by drawing a straight line through the initial sulfur wt % and final sulfur wt % values. Seven days exposure is a suitable period. The slope of the resulting line is defined as the sulfur deposition rate. Thus, the sulfur deposition rate is calculated by measuring the change in sulfur wt % (i.e. final S wt %–initial S wt %) divided by the days of continuous $H_2S$ exposure. Seven days exposure is a suitable period.

Furthermore however, the impact of the sulfur on the capacity of the adsorbent for impurity gases such as $H_2S$ and carbon dioxide also varies. Some adsorbents we find can tolerate accumulating sulfur better than others.

This can be measured by passing an $H_2S$ and $CO_2$ containing feed gas over an adsorbent to be tested, periodically regenerating the adsorbent by desorbing adsorbed $H_2S$ and $CO_2$ therefrom, withdrawing a sample of the adsorbent and measuring its sulfur content, and measuring the $CO_2$ capacity of the adsorbent, and continuing the process and repeating the measurements. The $CO_2$ capacity may be considered to be of interest both in its own right and as a surrogate measurement for $H_2S$ capacity as the two gases behave similarly and measuring $CO_2$ capacity is more convenient.

As the sulfur content of the adsorbent gradually increases, changes in the capacity of the adsorbent for $CO_2$ will be observed. The experimental set up used is not critical, but a suitable protocol is as follows. A test column is prepared containing a packed bed (e.g., 1" (2.5 cm) inside diameter×8" (20 cm) long stainless steel tube) of the adsorbent under test. Thirty to 100 grams of the adsorbent are packed into the column. A dry gas mixture containing by volume 1% $H_2S$, 8% CO, 37% $CO_2$ and balance $H_2$ is passed through the bed at 350 $cm^3$/min at 400 psig (2758 kPa) and 20° C. Samples are taken from the feed end of the adsorbent at intervals following a bed purge using $N_2$ at 100 $cm^3$/min, 400 psig (2758 kPa) for 24 hours at 20° C. Sulfur content is measured using X-ray fluorescence analysis. Carbon dioxide capacity is measured in a TGA by first heating the samples to 200° C. in flowing $N_2$ to remove volatile components, cooling to 40° C. in $N_2$, and then exposing the sample to $CO_2$ at 1 atmosphere at 40° C. and measuring its weight gain.

A plot of % capacity loss against sulfur content may not be linear. However an average value for the $CO_2$ capacity loss per wt % sulfur loading may be obtained from a plot of relative $CO_2$ capacity (i.e. actual $CO_2$ capacity/initial $CO_2$ capacity) against S loading by drawing a line through the initial and final values. A period of 30 days exposure is suitable.

As shown below, we have found that certain materials suggested in the prior art analyzed above suffer a more rapid accumulation of sulfur than others and also that certain such materials suffer a significantly more severe loss of capacity for a given sulfur loading than others. Activated carbons and activated alumina perform significantly less well than silica gel. However, whilst the art has until now drawn no distinction between commercially available silica gels for use in hydrogen purification, we have found that high purity silica gels, having therefore a low alumina content, perform substantially better than a commercial grade of silica gel exemplified by Sorbead Plus from Engelhard which contains 1% or more of alumina. Alumina is included in such silica gels in order to provide resistance to loss of mechanical strength upon exposure to water.

Preferably, the sulfur deposition rate of the adsorbent is less than 0.01 wt % S/day, more preferably less than 0.0075 and still more preferably less than 0.004.

Accordingly, according to the invention, the adsorbent may preferably comprise or consist of a silica gel having an $SiO_2$ content of at least 99% (hereinafter referred to as 'high purity silica gel'. Preferably the $SiO_2$ content is at least 99.2%, more preferably at least 99.5%, e.g. 99.7% by weight.

Preferably, the adsorbent may comprise an upstream (with respect to the direction of feed of the feed gas) portion of relatively low surface area high purity silica gel and a down stream portion of relatively high surface area high purity silica gel. The surface area of the relatively low surface area silica gel may for instance be below 400 $m^2$/g and the surface area of the relatively high surface area silica gel may for instance be above 600 $m^2$/g.

Other adsorbents having a better performance than Sorbead Plus are also preferred. These, as will be shown, include titania. Accordingly, the adsorbent for hydrogen sulfide may comprise or consist of titania. Suitable titania adsorbents include Hombikat K03/C6 from Sachtleben Chemie GmbH and CRS 31 from Axensi.

Preferably, the feed gas contains at least 0.2 vol % hydrogen sulfide, more preferably at least 1%, more preferably at least 2%. The hydrogen sulfide content may for instance be up to 5%. Preferably the feed gas is hydrogen rich and the process is one for producing purified hydrogen. For instance, the feed gas may contain at least 50 vol % hydrogen. Preferably, the principal impurity by volume to be removed is carbon dioxide. Thus, the feed gas may contain at least 80 vol % of hydrogen and carbon dioxide combined and may contain at least 20% or at least 30% carbon dioxide.

In certain preferred embodiments, the feed gas contains hydrogen as a desired component and at least hydrogen sulfide and carbon dioxide as impurities and purified hydrogen is obtained as an end product by contacting the feed gas with a single homogeneous adsorbent which has a sulfur deposition rate of less than 0.04 wt % S per day $H_2S$ exposure. Thus, the use of layered beds containing a number of different adsorbents for different impurities may be avoided.

This further makes it possible to refresh the adsorbent progressively as it reaches the end of its working life if sulfur accumulation renders it partially inoperative. Some of the adsorbent can be removed from the upstream end of the vessel containing the adsorbent, which may then be topped up from the downstream end of the vessel. To facilitate this, it is preferred that the vessel be oriented such that an inlet for feed gas is at or toward the lower end thereof and the feed gas flows upwardly to reach an outlet from the vessel.

Said feed gas is preferably a synthesis gas produced by gasification of a carbon source which is solid or liquid at STP, followed by a water gas shift reaction. Gasification is conventionally carried out by treating the carbon source with steam and either oxygen or air. Alternatively, the feed gas may be a carbon monoxide and hydrogen mixture containing impurities which is produced by a said gasification, without the water gas shift reaction.

In a second aspect, the invention provides a process for the removal of hydrogen sulfide from a feed gas containing at least hydrogen sulfide as an impurity, said process comprising contacting the feed gas with an adsorbent for hydrogen sulfide, and adsorbing hydrogen sulfide from said feed gas to produce a hydrogen sulfide depleted feed gas, wherein the adsorbent for hydrogen sulfide comprises or consists of a cross-linked resin having no ionic groups and no hydrogen sulfide reactive functional groups.

Whilst the sulfur deposition rate and $CO_2$ capacity sensitivity to sulfur loading is not necessarily as good as a conventional silica gel such as Sorbead Plus, these resins have the advantage that they are more hydrophobic so that their $CO_2$ capacity may be less sensitive to water where that is a component of the feed gas.

Features indicated to be preferred above in relation to the first aspect of the invention may be applied to the second aspect also. The resin may be used as a single homogeneous adsorbent as described above and may be used in combination with one or more or all of the adsorbents described with reference to the first aspect of the invention.

The invention includes apparatus for use in purifying hydrogen by removal of impurities from a hydrogen feed gas, said apparatus comprising a flow path for said feed gas containing an adsorbent for hydrogen sulfide, said flow path having a feed direction, and a sulfur deposition rate of less than 0.04 wt % S per day $H_2S$ exposure, and an adsorbent for carbon dioxide in said flow path downstream in said feed direction from said adsorbent for hydrogen sulfide.

The apparatus may further comprise a gasifier for steam reforming of a carbon source and a water gas shift reactor for producing said hydrogen feed gas connected in said flow path and located upstream with respect to said feed direction from said adsorbent for hydrogen sulfide.

The apparatus may further comprise an air separation unit (ASU) for producing separate flows of nitrogen and of oxygen respectively, said flow of oxygen being directed to said gasifier.

The apparatus may further comprise a power generating combustor connected to receive hydrogen purified by said adsorbent for hydrogen sulfide and said adsorbent for carbon dioxide and further connected to receive said flow of nitrogen to act as a diluent for combustion of said purified hydrogen in said combustor. The combustor is suitably a gas turbine.

Preferably, said flow of nitrogen is connected to flow counter current to said feed direction as a regeneration gas flow through said adsorbent for hydrogen sulfide and the apparatus further comprises a flow controller for selecting between feed gas flow through said adsorbent for hydrogen sulfide and regeneration gas flow therethrough. The invention includes in a further aspect a process for the purification of a hydrogen rich feed gas containing at least carbon dioxide and hydrogen sulfide as impurities, comprising contacting the feed gas with a first adsorbent contained in a first adsorbent vessel and thereby removing hydrogen sulfide from said feed gas to form a hydrogen sulfide depleted feed gas and contacting said hydrogen sulfide depleted feed gas with at least a second adsorbent contained in a second adsorbent vessel to remove at least carbon dioxide from said hydrogen sulfide depleted feed gas, and at intervals regenerating said first adsorbent and at different intervals regenerating said second adsorbent, wherein said first adsorbent is silica gel, titania, or a cross-linked resin having no ionic groups and no hydrogen sulfide reactive functional groups.

This aspect of the invention includes apparatus for use in purifying hydrogen by removal of impurities from a hydrogen feed gas, said apparatus comprising a flow path for said feed gas containing a first adsorbent in a first adsorbent vessel for adsorbing hydrogen sulfide, said flow path having a feed direction, a second adsorbent in a second adsorbent vessel for adsorbing at least carbon dioxide in said flow path downstream in said feed direction from said first adsorbent vessel, a source of at least one regeneration gas, a regeneration controller for at first intervals directing a regeneration gas from said source of regeneration gas to regenerate said first adsorbent, and for at second intervals directing a regeneration gas from said source of regeneration gas to regenerate said second adsorbent, wherein said first adsorbent is silica gel, titania, or a cross-linked resin having no ionic groups and no hydrogen sulfide reactive functional groups. The first adsorbent vessel (guard bed) may contain further adsorbents, e.g. as separate layers, for removing other impurities, such as metal carbonyls, aromatics, heavy hydrocarbons, or other sulfur containing species such as mercaptans.

The first adsorbent containing vessel (or guard bed) may preferably contain an upstream portion of lower surface area silica gel and a downstream portion of higher surface area silica gel, each of the kind previously described.

Regeneration of the guard bed may be by waste gas from the regeneration of the carbon dioxide adsorption or may be by ASU nitrogen, even where the carbon dioxide regeneration is by hydrogen. Also, the manner of the regeneration of the guard bed and carbon dioxide adsorbent bed may be different, e.g. the former being by TSA or a variant thereof (e.g TPSA or TEPSA) or VSA, whilst the carbon dioxide adsorbent is regenerated by PSA.

BRIEF DESCRIPTION OF SEVERAL VIEWS OF THE DRAWINGS

FIG. 1 shows graphs showing rates of sulfur deposition on various adsorbents;

FIG. 2 shows plots of sulfur deposition on various adsorbents from a wet feed gas;

FIG. 3 shows the effect of sulfur deposition on the relative carbon dioxide adsorption capacity of various adsorbents, the lowest S loading performance being shown enlarged in FIG. 3a;

FIG. 10 shows the effect of hydrogen sulfide exposure on the carbon dioxide capacity of various adsorbents.

DETAILED DESCRIPTION OF THE INVENTION

The current invention, in typical embodiments, provides a PSA process for the production of an enriched hydrogen product stream in which the feed gas contains at least 0.2 vol % (2000 ppm) $H_2S$. The invention is not however limited to the use of PSA. As discussed above, $H_2S$ can react with various adsorbents surfaces and over time result in plugging of the adsorbent with elemental sulfur. This adsorbent plugging with elemental sulfur reduces the adsorption capacity of the adsorbent which lowers the performance (lower $H_2$ production rate and lower $H_2$ recovery) of the PSA over time.

In preferred embodiments $H_2PSA$ beds contain a layer (preferably a first or only layer) of adsorbent that can tolerate the various impurities found in gasifier syngas, particularly >0.2% $H_2S$.

We have conducted experimental work that indicates that a preferred PSA treating $H_2S$-containing syngas should have a first layer or only layer composed of either silica gel of high purity and low surface area, titania, or a polymeric adsorbent. Whereas the resins described for use in U.S. Pat. No. 5,797, 979 are chemically reactive with $H_2S$, resins of the current invention consist of crosslinked polymers, typically polystyrene crosslinked with divinylbenzene. So-called "hyper-crosslinked" resins undergo additional crosslinking resulting in a more uniform pore size distribution and improved sorption properties. The current resins contain no charge moieties or reactive functional groups. In fact, these polymeric resins are generally considered to be chemically inert and, unlike the resins of '979, undergo no chemical reaction with adsorbed $H_2S$. Useful resins for the current invention include but are not limited to Amberlite XAD4, XAD7, and XAD16 supplied by Rohm and Haas, Dowex Optipore V493 and V503 from Dow Chemical, and MN-200 resin supplied by Purolite, Inc.

Figure 4:
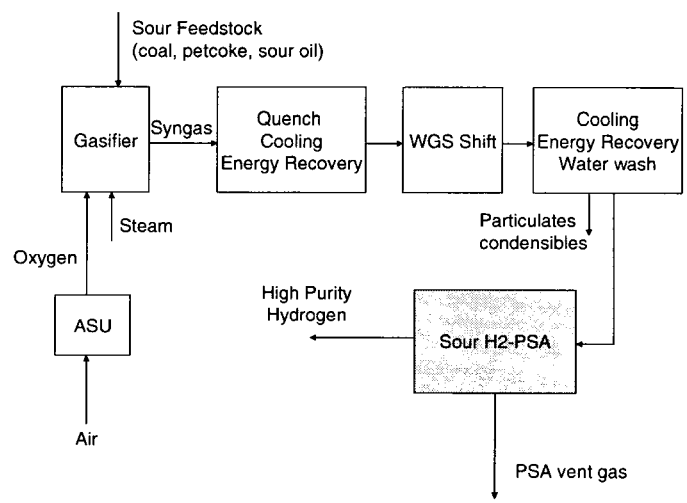
FIG. 4 shows a schematic arrangement of apparatus for producing high purity hydrogen.

FIG. 4 gives a block diagram of a first system to produce pure $H_2$ from a high $H_2S$ containing gas stream. A carbonaceous feed stock containing sulfur species (e.g., coal, petcoke, biomass, sour liquid oils or tars) is gasified in steam and oxygen in a gasifier. The hot effluent gases containing predominantly CO, $H_2$, and $CO_2$ are quenched and/or cooled and energy is recovered. They are then fed to a water gas shift reactor where CO and water are reacted to $CO_2$ and $H_2$. The effluent gas containing predominantly $H_2$ and $CO_2$ with relatively low levels of CO, $H_2S$, $CH_4$, inerts ($N_2$, Ar), and other contaminants (e.g, Hg, As, $NH_3$, HCl, etc) is then cooled to 30-70° C., washed with water to remove soluble components, and passed to the sour PSA unit.

The feed gas containing at least 0.2 vol % $H_2S$ is directed into the Sour $H_2PSA$ unit which contains a first layer of polymeric resin, titania or high purity silica gel or mixtures thereof. $H_2S$ is adsorbed in this layer, and an $H_2S$-free synthesis gas is passed to subsequent layers of alumina, activated carbon, and/or molecular sieves in the Sour $H_2$ PSA to produce 95% or higher hydrogen product. In customary practice, to purify $H_2$ streams with significant levels of hydrocarbons, the PSA beds are usually layered. Generally an alumina layer is used at the feed end of the bed to remove heavy hydrocarbons. The feed gas then passes through a layer of silica gel for intermediate hydrocarbon removal ($C_4$ and $C_5$). A carbon layer is used to remove $CO_2$ and $CH_4$ and a zeolite layer is used to remove $N_2$, Ar, and CO. The data presented herein shows alumina and activated carbon cannot be used with $H_2S$ containing streams with levels at 1 vol %. However, since a supplementary first layer of polymeric resin, titania, or high purity silica gel adsorbent will adequately remove the $H_2S$, these adsorbents can be used in subsequent PSA layers without risk.

The Sour $H_2PSA$ could preferably contain anywhere from 4 to 16 beds. The process steps utilized in the illustrative Sour $H_2PSA$ would be those practiced for conventional $H_2PSA$'s—feed, pressure equalizations, provide purge, blowdown, receive purge, and repressurization. Feed pressure could range from 50 to 1000 psig (345-6900 kPa) and the purge step would be carried out at 5 to 30 psig (35-207 kPa). Feed temperature could range from 0 to 60° C. Adsorbent particle size could range from 1 mm to 5 mm.

Figure 6:
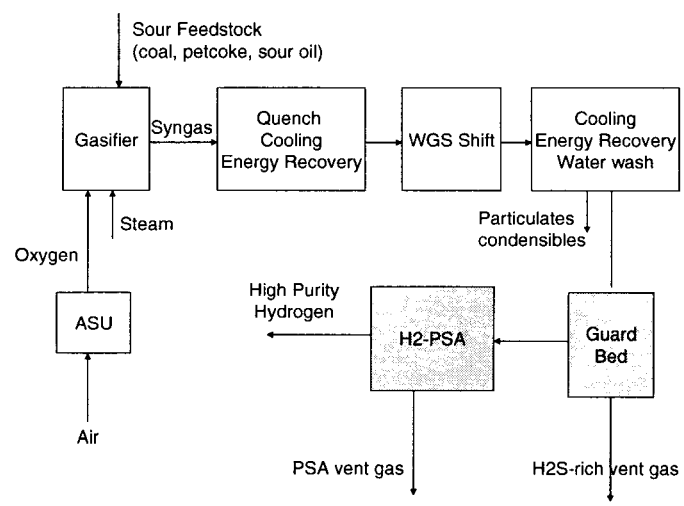
FIG. 6 shows a schematic arrangement of apparatus for producing high purity hydrogen including a guard bed for hydrogen sulfide removal.

FIG. 6 illustrates an alternative approach where the adsorbents described herein as the first adsorbent layer to be contacted with the feed gas could be present as guard bed in front of the $H_2PSA$. The main advantages of using a guard bed are 1) a concentrated $H_2S$ containing stream can be reclaimed from the guard bed, 2) in the event of adsorbent fouling, simply the guard bed needs to be replaced, 3) regeneration mode of the guard bed can be different from that of the $H_2PSA$, and 4) the guard bed can be optimized (e.g., by adding additional adsorbent layers) to remove other undesirable species possibly present in the feed gas including metal carbonyls, aromatics, heavy hydrocarbons, other sulfur containing species etc.

The guard bed removes essentially all of the $H_2S$ in the feed gas. In this way, the PSA vent gas from the $H_2PSA$ (regeneration effluent) is sulfur-free and can be burned, converted and treated without special sulfur removal technology. In addition, the waste gas from the guard bed can be obtained in concentrated form. Regeneration of the guard bed could use waste gas from the PSA or could use waste $N_2$ from the air separation plant.

The feed gas containing at least 0.2 vol % $H_2S$ is directed into the guard bed. The guard bed contains polymeric resin, titania or high purity silica gel or mixtures thereof. $H_2S$ is adsorbed in the guard bed and an $H_2S$-free synthesis gas is directed into a typical $H_2PSA$. Product gas consisting of 95% or higher hydrogen is produced for the $H_2PSA$.

This illustrative $H_2PSA$ could contain anywhere from 4 to 16 beds. The adsorbents inside the $H_2PSA$ vessels could include alumina, activated carbon, silica gel and zeolites. Generally an alumina layer is used to remove heavy hydrocarbons passing through the silica gel layer, a carbon layer is used to remove $CO_2$ and $CH_4$ and a zeolite layer is used to remove $N_2$, Ar, and CO. The data presented herein shows alumina and activated carbon can not be used with $H_2S$ containing streams with levels at 1 vol %. However, since the guard bed adequately removes the $H_2S$, these adsorbents can be used in the main $H_2PSA$ without risk.

The process steps utilized in the $H_2PSA$ would be those practiced for conventional H2PSA's—feed, pressure equalizations, provide purge, blowdown, receive purge, and repressurization. Feed pressure could range from 50 to 1000 psig (345-6900 kPa) and the purge step would be carried out at 5 to 30 psig (35-207 kPa). Feed temperature could range from 0 to 60° C. Adsorbent particle size could range from 1 mm to 5 mm.

The guard bed could suitably consist of 2-4 beds. If the beds are run in a PSA mode the various cycle steps that could be employed include feed, pressure equalization, blowdown, purge and repressurization. Purge gas can come from one of the guard beds or, preferably, from the $H_2$PSA vent gas. Repressurization gas can be from the sour feed gas, one of the guard bed product gas flows or from some of the $H_2$PSA product gas. The PSA guard bed would represent the lowest capital cost guard bed system. However, it is likely that all the waste gas from the main PSA would be required to clean the guard bed. That would result in all the waste gas from the system containing $H_2S$.

If the guard bed were run in VSA (vacuum swing adsorption) mode, less regeneration gas would be required. In this way, two waste streams could be produced from the system, one waste gas from the guard bed which contains $H_2S$ and the other waste stream from the PSA which does not contain $H_2S$. The concentrated $H_2S$ waste stream could be treated with a different technology (e.g. S collection via Claus reaction) than a more dilute $H_2S$ containing stream. The VSA cycle steps could include feed, pressure equalization, blowdown, evacuation, purge and repressurization. The vacuum level employed could be 0.1 to 0.7 bar absolute.

If the guard bed was run in TSA mode, regeneration gas could be supplied by waste nitrogen from the cryogenic oxygen system or could be supplied by the $H_2$PSA vent gas. In this way a $H_2S$ concentrated reject stream could be generated by the TSA. The regeneration temperature could vary from 50 to 200° C. Typical process steps could be feed, pressure equalization, blowdown, heating, cooling and repressurization. The regeneration temperature could be reached using waste heat in the synthesis gas generation process.

There could also be integration steps between the ASU, guard bed and the $H_2$ PSA. For example, gas released during pressure reduction steps in the guard bed could be sent to the $H_2$ PSA to improve the overall $H_2$ recovery. High pressure waste $N_2$ from the oxygen production plant could be used as a displacement gas in the $H_2$ PSA to improve the overall $H_2$ recovery. Still more preferably, the high pressure waste $N_2$ could be used as displacement gas in the guard bed units, again to improve $H_2$ recovery of the overall process.

Another aspect of the guard bed is that the time on stream for the guard bed can be longer than the time on stream for the $H_2$PSA. For the $H_2$ PSA the feed time can range from 0.5 to 5 minutes, while for the guard bed, the feed time can vary from 10 to 60 minutes. The regeneration interval can be substantially longer for the guard bed than for the $H_2$PSA even where both are regenerated by PSA because of the high $H_2S$ capacity of the guard bed. However, the guard bed may instead be regenerated by TSA.

As noted above, the concept of a guard bed prior to the $H_2$PSA has been previously described. In FIG. 2 of U.S. Pat. No. 4,696,680 a guard bed for $CO_2$ and $H_2S$ removal from synthesis gas is described. However, there the adsorbents suggested were activated carbon and zeolites. Such adsorbents do not satisfy the requirement herein for low sulfur deposition or low loss of capacity for $CO_2$ upon sulfur loading provided herein by adsorbents such as polymeric resins, high purity silica gel and titania. Further, the guard bed in the current invention is intended for $H_2S$ removal without substantial removal of $CO_2$. Owing to the $H_2S$ over $CO_2$ selectivity of the suggested adsorbents, guard bed sizes could be much smaller if $H_2S$ removal only is desired. In envisioned practice current invention, the bulk of $CO_2$ enters into the $H_2$ PSA in contrast to the teachings of '680.

Figure 7:
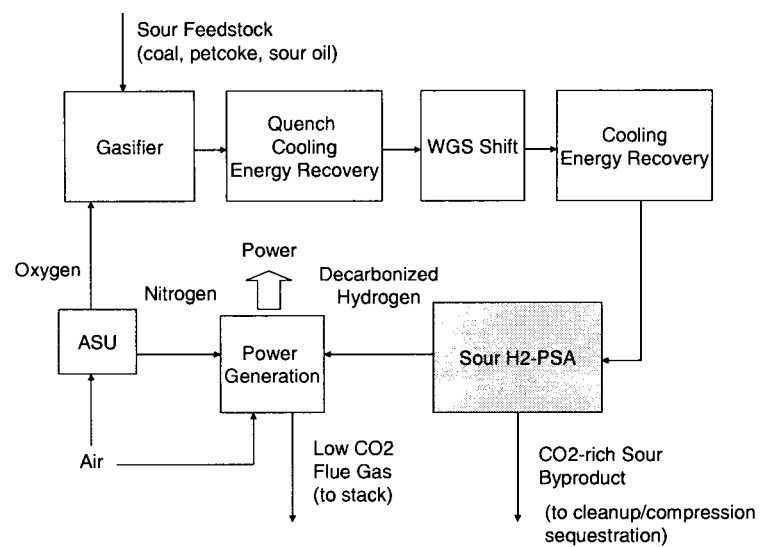
FIG. 7 shows a schematic arrangement of apparatus for producing purified hydrogen and for combusting the same for power generation.

Incorporation of the sour $H_2$PSA concept with gasifier-based power production yields a number of advantages. An overall process schematic is illustrated in FIG. 7. A carbonaceous feed stock containing sulfur species (e.g., coal, petcoke, biomass, sour liquid oils or tars) is gasified in steam and oxygen in a gasifier. The hot effluent gases containing predominantly CO, $H_2$, and $CO_2$ are quenched and/or cooled and energy is recovered. They are then fed to a water gas shift reactor where CO and water are reacted to $CO_2$ and $H_2$. The effluent gas containing predominantly $H_2$ and $CO_2$ with relatively low levels of CO, $H_2S$, $CH_4$, inerts ($N_2$, Ar), and other contaminants (e.g, Hg, As, NH3, HCl, etc) is then cooled to 30-70° C. and passed to the sour PSA unit.

The goal of this sour PSA unit is to remove effectively 1) essentially all of the $H_2S$ and other contaminants (>99% removal) and 2) most (e.g. 90%) of the carbon species from the syngas. The decarbonized product gas from the PSA is then combined with a suitable diluent (e.g., $N_2$ from the ASU) and combusted with air in a gas turbine for power production. The flue gas from the turbine combuster is predominantly nitrogen and water, with much lower levels of $CO_2$ than if the carbonaceous feed stock or the sour syngas was directly combusted. The low pressure waste gas from the sour PSA unit is enriched in $CO_2$, $H_2S$, and the other contaminants. It is processed further to produce a compressed $CO_2$-rich, $H_2S$ free stream that can be sequestered or vented to the atmosphere. An additional sulfur-rich byproduct stream will be created in this processing that will capture the $H_2S$ and other contaminants (e.g., sulfur via a Claus plant or sulfuric acid via US 2007/0178035).

A conventional $H_2$-PSA unit would not work well in this context. Conventional PSA units typically utilize a layer of carbon followed by a layer of zeolite in each adsorber bed. Carbon is used to remove $CO_2$, $H_2O$, and some $CH_4$, while the zeolite layer removes $CH_4$, CO, Ar and $N_2$. Other options utilize a layer of alumina at the bottom of the bed. Our experiments have shown that the sour syngas reduces the capacity of the carbon and alumina adsorbent, thus beds packed with these materials at the feed end would slowly lose capacity to remove $CO_2$ and $H_2S$ from the feed gas. These impurities would move to the zeolite layer where they are adsorbed even more strongly—to the point where they do not effectively desorb during regeneration. The effective capacity of the adsorption bed would be severely reduced and process performance would deteriorate.

Conventional PSA units are generally configured with the zeolite layer in order to remove $CH_4$, CO and the inert gases from the hydrogen product. In power generation though, there is no need to remove the inerts, as $N_2$ is added to dilute the hydrogen product once it leaves the sour PSA. There is also little reason to remove the CO and $CH_4$, as they generally account for a relatively small amount of carbon in the sour syngas. Using a conventional PSA unit with a zeolite layer for this particular application would yield high purity hydrogen product at relatively low $H_2$ recovery. This embodiment of the PSA process of this invention overcomes this limitation and yields much higher $H_2$ recovery.

In all of the above cases, the enriched $H_2$ from the sour PSA can be fed to a gas turbine for combustion and power production. It will first be diluted with $N_2$ (from the ASU) or steam to limit the gas temperature in the turbine to acceptable levels. It is clearly not important to keep inert gases ($N_2$, Ar) from the PSA product gas. This leads to a second way for improving H2 recovery from the sour PSA system—by purging or pressurizing the PSA beds with $N_2$ rather than $H_2$. The next example describes simulations the PSA beds purged with $N_2$ rather than the typical $H_2$ product gas.

We have conducted some simulations of performance of the Sour $H_2$PSA option and the Guard bed/$H_2$PSA approach which are described below.

Example 1

The stability of various adsorbents was tested upon exposure to $H_2S$ containing synthesis gas. The adsorbents tested included two activated carbons (Calgon 12×30 OLC, coconut-based and Calgon 4×10 BPL, coal-based), an activated alumina (Alcan 8×14 AA300), high purity silica gel (Grace Grade-40 99.7% $SiO_2$), a low purity silica gel (Engelhard Sorbead Plus, 99.0% $SiO_2$) a polymeric resin (Dowex Optipore V-493) and a titania (Hombikat K03/C6). Packed beds were filled with 20-50 g of the above samples and exposed to approximately 350 cc/min gas flow at 400 psig (2760 kPa) and 20° C. The gas consisted of a flow of 1% $H_2S$, 8% CO, 37% $CO_2$, and balance $H_2$. Seven additional beds were packed with the same adsorbents and were exposed to the same feed gas, although saturated with water at room temperature. The beds were held at ambient temperature during the experiments.

Adsorbent samples were removed from the beds at various time intervals to evaluate the adsorbents chemical composition and adsorption properties. Before sampling, all beds were purged with 100 cc/min of $N_2$ at 400 psig for 24 hours. All samples (2-5 g) were taken from the top of the beds (feed end). Analyses were conducted on fresh adsorbent samples as well as the exposed samples. Chemical compositions of the samples were determined by X-ray fluorescence analysis. A TGA unit was used to determine the amount of volatiles desorbed on heating to 200° C. (100° C. for resin) in $N_2$. This regenerated sample was then cooled to 40 C and exposed to 1 atm of $CO_2$. The final steady weight yielded a measure of the $CO_2$ adsorption capacity. Conventional low temperature $N_2$ adsorption techniques were used to quantify the adsorbent surface area and provide details on the pore volume of the samples (conducted after an initial regeneration under vacuum at 200° C.).

FIG. 1 shows a plot of the sulfur content of the various adsorbents upon exposure to a dry stream as a function of treatment time. The results clearly show that an increase in sulfur loading is detected as a function of exposure time for all the adsorbents tested. However, the high purity silica gel, and titania are the most resistant showing lower levels of rate of accumulation of sulfur than the lower purity silica gel or the activated carbon or activated alumina. These results would suggest that using an initial adsorbent layer of lower purity silica gel, activated carbon or activated alumina in a PSA system would result in a rapid decay in performance over time.

FIG. 2 shows a similar plot to that in FIG. 1 except this time the feed gas stream is wet (saturated with water at feed conditions). In the wet feed stream, the activated carbons still show rapid increase in sulfur content. In the wet feed stream the activated alumina and the Sorbead Plus (for which the 0 day and 7 day figures coincide with those for the activated alumina) show a lower rate of sulfur deposition. Nonetheless, even in the wet feed gas streams, the titania and the high purity silica gel show the lowest rate of sulfur deposition.

Figure 3A:
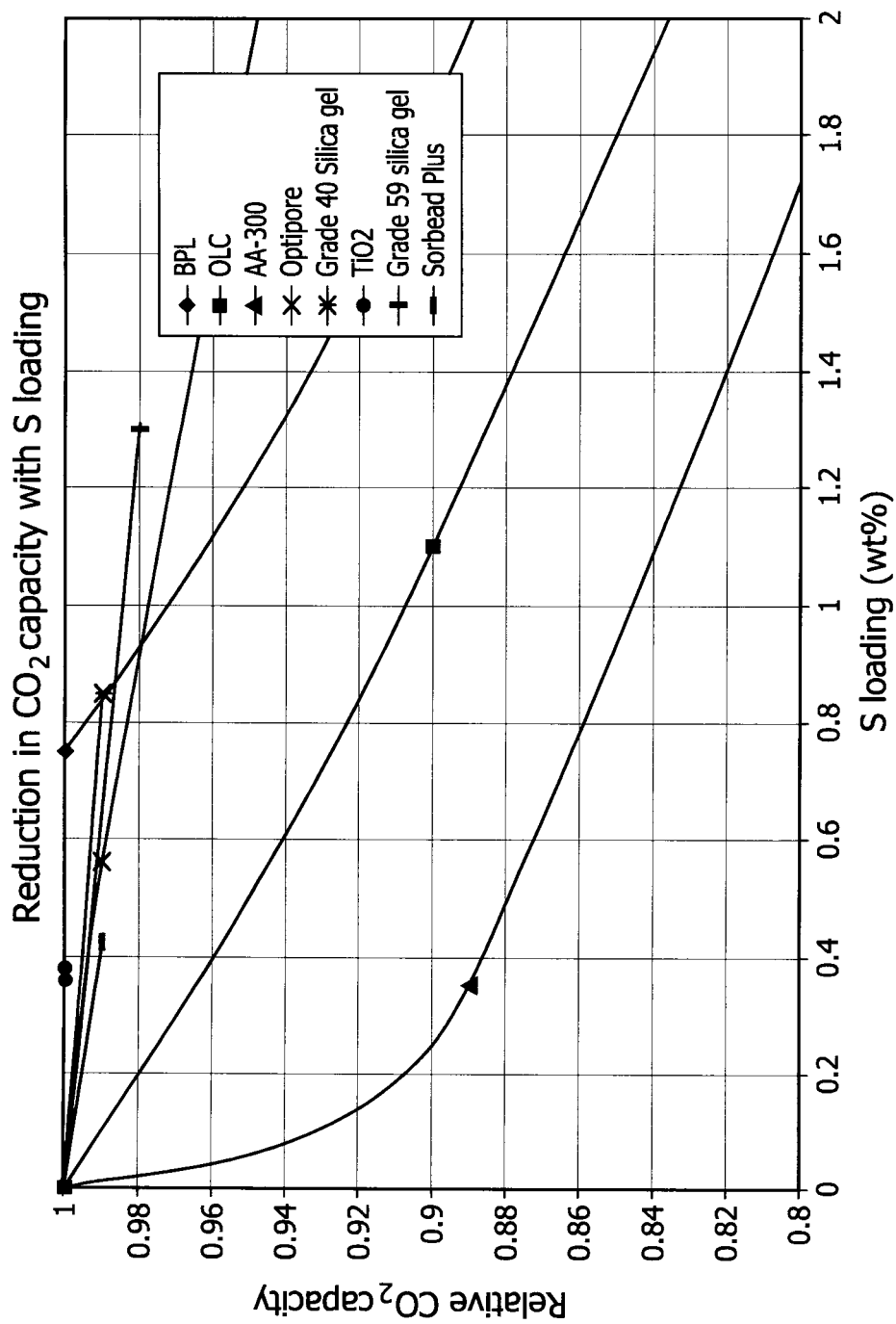

FIG. 3 shows the effect of sulfur loading on the resultant $CO_2$ capacity of the adsorbent. FIG. 3 also contains results of testing of a low surface area, high purity silica gel (99.7% $SiO_2$), Grace Grade 59. While sulfur loading is an undesired effect, the important aspect of this sulfur loading is its effect on the adsorption capacity of the material. Clearly, the most robust surfaces with respect to sulfur loading are the high purity silica gel, titania and polymeric resin. The interesting aspect of FIG. 3 is that the effect of sulfur loading vs. reduction in $CO_2$ capacity is different for different adsorbents, as indicated by the slopes of the graphs. At a sulfur loading of 2 wt %, the polymeric resin retains 95% of its original $CO_2$ capacity while the alumina sample only retains 80% of its original $CO_2$ capacity at that sulfur loading. Both activated carbon samples show a more pronounced effect of sulfur loading on $CO_2$ capacity than the polymeric resin.

FIG. 10 further illustrates deleterious effects of $H_2S$ exposure on adsorbents discussed in commonly referred to in the prior art. After 30 days exposure to $H_2S$ at ambient conditions, the $CO_2$ capacity of BPL carbon decreases by 64%. OLC Carbon is even more adversely affected, with its $CO_2$ capacity decreasing by 80%. Alumina too decreases in capacity by 56% after 30 days of $H_2S$ exposure. Both the high purity silica gel and the polymeric resin show remarkable $CO_2$ capacity retention after H2S exposure, with the resin only losing 9% capacity, and the high purity silica gel remaining essentially unchanged.

Example 2

To better understand the effect of surface chemistry on the reaction of adsorbents with $H_2S$, the zero point of charge (zpc) of the various adsorbents was tested. The zpc of a material is the pH at which the surface of the material carries no net electric charge. The zero point of charge for the various materials was determined by placing 20 grams of adsorbent in 100 ml of water and testing the pH after 24 hours. The pH of the initial solution was 7.2 and $N_2$ was bubbled through the solution during the 24 hour hold period. Table 1 below shows various properties of the adsorbents tested including BET surface area, zpc, the sulfur deposition rate determined from FIG. 1 up to 7 days of exposure (slope of FIG. 1 from linear regression best fit) and the percentage loss in $CO_2$ capacity as a function of sulfur loading derived from FIG. 3 (slope of FIG. 3 from linear regression up to seven days S accumulation). This value then corresponds to the percentage of $CO_2$ capacity lost for each wt % loading of sulfur in that period. Clearly, the lower value of this slope, the less affected the adsorbent is by sulfur loading.

TABLE 1

| Adsorbent | BET surface area ($m^2/g$) | zpc (pH units) | S deposition rate (change in wt % S/day) | $CO_2$ capacity reduction/S loading (% capacity loss/% S) |
|---|---|---|---|---|
| BPL | 1100 | 9.5 | 0.23%/day | 9.47 |
| OLC | 1200 | 9.2 | 0.15%/day | 9.10 |
| AA-300 | 325 | 9.9 | 0.05%/day | 31.43 |
| Grade 40 | 750 | 5.6 | 0.0014%/day | 1.18 |
| Grade 59 | 300 | 5.8 | 0.0013%/day (at 60 deg C.) | 1.54 |
| Optipore | 1100 | 7.2 | 0.078%/day | 1.79 |
| Sorbead Plus | 700 | 6.3 | 0.06%/day | 2.38 |
| Hombikat titania | 100 | 7.8 | 0.0003%/day | 0.80 |

It can be seen that whilst the best of the prior art materials (Sorbead Plus) has a sulfur deposition rate of 0.06%/day, the materials according to the first aspect of the invention have a deposition rate of no more than 0.0014%/day. Also, the rate of capacity loss for Sorbead Plus is 2.38% whereas that for the materials used in the first aspect of the invention is not more than 1.54%.

Example 3

Figure 5:
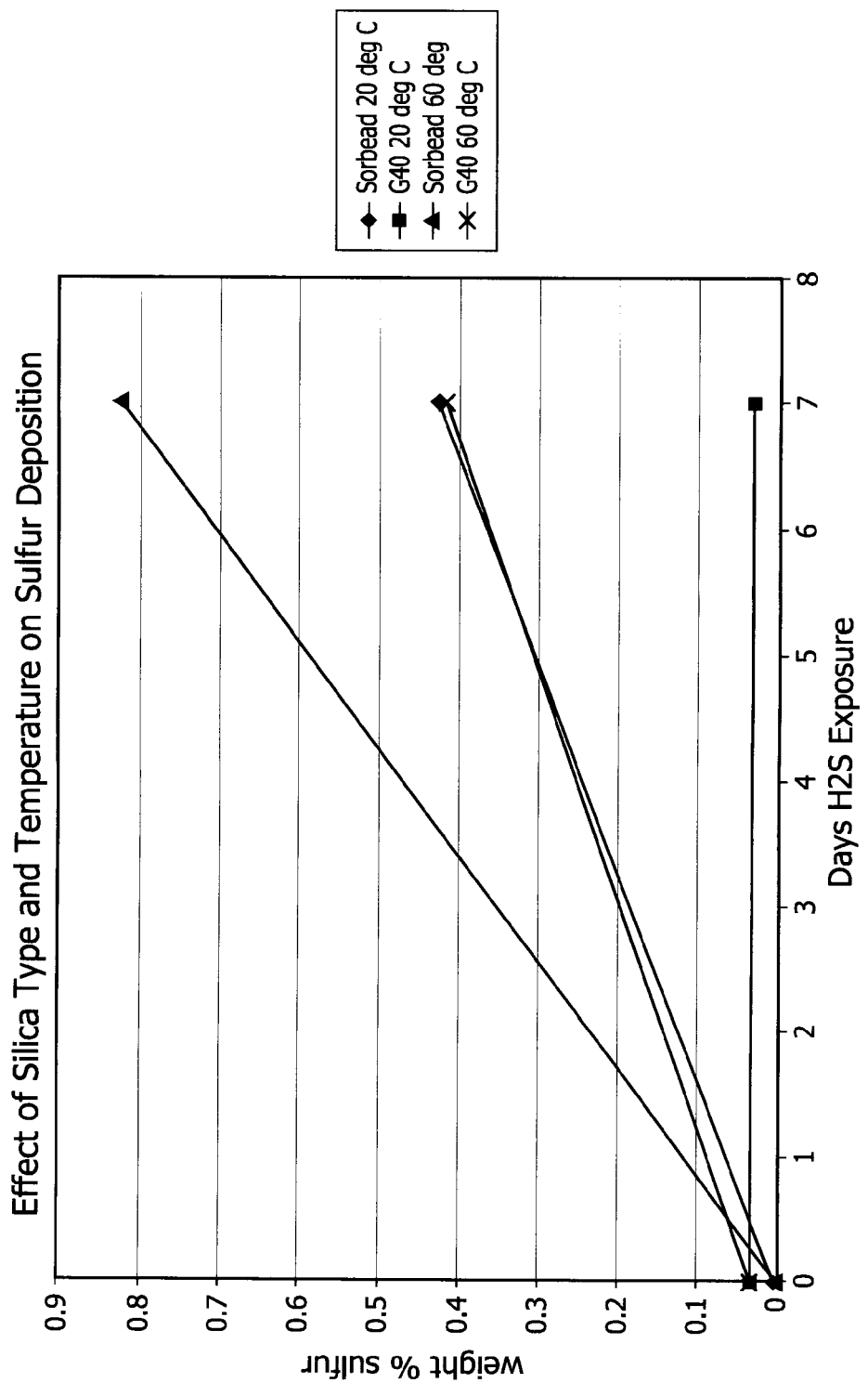
FIG. 5 shows plots showing the effect of temperature on the rate of sulfur deposition on two grades of silica gel.

Experiments were carried out to determine the effect of adsorption temperature on sulfur deposition as well as the effect of silica gel type on sulfur deposition. The experiments were carried out as those described in Example 1 with Grace Grade 40 silica gel and Engelhard Sorbead Plus silica gel at 20 and 60° C. feed temperatures. The results of that testing are shown in FIG. 5. The results clearly show that 1) the type of silica gel impacts the rate of sulfur deposition and 2) the higher the feed temperature, the higher the sulfur deposition rate. These data suggest that 1) low feed temperatures to the PSA are desired and 2) high purity silica gel (greater than 99%) is more robust than lower purity silica gel, having not only the lower loss of capacity with a given sulfur loading demonstrated in FIG. 3, but also a lower sulfur loading in a given period of use.

Example 4

Performance of a Sour $H_2$PSA unit containing high purity silica gel, carbon, and 5A zeolite in a range of volume ratios was simulated using a proprietary computer program. Feed gas contained approximately 54% hydrogen, 42% carbon dioxide, 1.5% hydrogen sulfide, 0.03% carbon monoxide, and trace amounts of argon, nitrogen, and methane. A 10-bed PSA cycle utilizing four pressure equalization steps, interbed purge, and product repressurization was simulated at a feed pressure of approximately 32 atm. Carbon monoxide in the product was specified at 5 ppm and interbed purge amount was optimized. Results are shown in Table 2.

TABLE 2

| Adsorbent Ratio (silica/carbon/5A zeolite) | H2S (ppm) at carbon layer | CO2 (ppm) at 5A layer | H2 Recovery % | Relative Productivity |
|---|---|---|---|---|
| 1.3/1.4/1 | 119 | 3488 | 92.0 | 1.00 |
| 1.8/2.4/1 | 104 | 104 | 91.7 | 0.99 |
| 2/2.2/1 | 20 | 99 | 91.5 | 1.00 |
| 2.2/2/1 | 6 | 93 | 91.3 | 1.00 |
| 1.8/1.5/1 | 7 | 532 | 91.7 | 1.01 |

The silica gel layer is capable of limiting the $H_2S$ level at the carbon layer to levels that are tolerable (<1000 ppm). High purity $H_2$ can be produced at high level of recovery with the adsorbent layers described in the current invention.

Example 5

The performance of a 4-bed "guard" PSA system containing silica gel for the removal of hydrogen sulfide was simulated using a proprietary computer program. Feed gas contained approximately 54% hydrogen, 42% carbon dioxide, 1.5% hydrogen sulfide, 0.03% carbon monoxide, and trace amounts of argon, nitrogen, and methane. A cycle utilizing two pressure equalization steps, product repressurization, and a purge of waste gas from an $H_2$PSA was simulated at a feed pressure of approximately 32 atm. Purge amount was optimized, and performance was predicted for hydrogen sulfide in the product specified at 5 ppm and 100 ppm. Results are shown in Table 3.

TABLE 3

| H2S (ppm) in product | CO2 (ppm) in product | H2 Recovery % from feed | Relative Productivity |
|---|---|---|---|
| 5 | 16 | 91.7 | 1.00 |
| 100 | 21 | 93.0 | 1.13 |

A simple Guard Bed PSA system containing high purity silica gel is capable of efficiently reducing the $H_2S$ in the syngas to levels that can be tolerated by a conventional $H_2$PSA system (<1000 ppm).

Example 6

Performance of a PSA unit containing carbon and 5A zeolite in a range of volume ratios was simulated using a proprietary computer program. Feed gas composition was equivalent to the product stream from Example 5 (5 ppm case), such that an integrated PSA system was simulated. A 10-bed PSA cycle utilizing four pressure equalization steps, interbed purge, and product repressurization was simulated at a feed pressure of approximately 32 atm. Carbon monoxide in the product was specified at 5 ppm and interbed purge amount was optimized. Results are shown in Table 4.

TABLE 4

| Adsorbent Ratio (carbon/5A zeolite) | CO2 (ppm) at 5A layer | H2 Recovery % | Relative Productivity |
|---|---|---|---|
| 1.5/1 | 12 | 86.8 | 1.00 |
| 1.14/1 | 105 | 87.3 | 1.03 |

This indicates that overall recovery for the combined guard bed PSA+H2PSA process will be 0.917*0.873=80%.

Example 7

Computational simulation results are provided in the following examples to illustrate the performance of the sour PSA process for this application.

In all of these cases the sour PSA process was designed to reject 90% of the carbon species ($CO$, $CO_2$, $CH_4$) in the feed gas to yield a decarbonized, hydrogen-rich product gas. The feed gas was assumed to be cooled, shifted syngas from a conventional coal gasifier and consisted of 49.32% $H_2$, 44.70% $CO_2$, 3.47% CO, 1.36% $H_2S$, 0.72% Ar, 0.42% $N_2$, and 0.01% $CH_4$. It was assumed to be available at 100° F. (38° C.), 30 atm. The PSA process used 10 packed beds, each undergoing the steps illustrated in Table 4 (two beds on feed at a time, four pressure equalizations). Individual step time (as illustrated in Table 4) was 30 seconds, so each bed completed a full cycle in 600 seconds. The low pressure blowdown and purge steps vented to a tank maintained at a pressure of 1.7 atm.

Simulations were conducted by solving the heat, momentum, and mass balance equations for each step of the process, and repeating the process for additional cycles until the system attained cyclic steady state conditions (defined as the point where time-dependent temperature, composition, and pressure variables for two consecutive cycles are identical). Process performance was characterized by evaluating the hydrogen recovery (moles of hydrogen in the product gas divided by moles of hydrogen in the feed gas) and the feed loading (total lb mole of feed gas processed per hour divided by the total bed volume).

In the first set of simulations, bed loadings of 17' (5.2 m) of silica gel followed by 13' (4 m) of activated carbon were assumed. A series of simulations were conducted with different amounts of purge gas. The amount of purge gas used is referenced by a purge parameter evaluated as the change in the 'providing bed' pressure during the 'provide purge' step divided by the sum of the change in 'providing bed' pressure during the 'provide purge' and 'blowdown' steps (in essence, the amount of gas used to purge the beds divided by the maximum amount available (total amount of purge plus blowdown gas)). These results are plotted in FIG. 8.

The high purity silica gel layer was used to limit the $H_2S$ level to the carbon layer to less than 300 ppm. This $H_2S$ level is acceptable for continuous operation of activated carbon in a PSA unit.

The amount of feed gas in the simulations was manipulated in each run to yield 90±1% carbon rejection to the waste gas. Surprisingly high hydrogen recoveries, greater than 92% and approaching 96% for the lowest purge case, are predicted from the simulations. They are beyond the level normally associated with conventional $H_2$-PSA technology (typical recovery <90%). The reasons for this improvement are 1) elimination of the ineffective zeolite layer and 2) operation of the PSA so significant Ar, $N_2$, CO, $CH_4$, and $CO_2$ slip to the product.

Example 8

In the next set of simulations the adsorption columns were considered packed with 30 ft (9.2 m) of high purity silica gel. In this case, the silica gel removes all of the undesirable components of the sour syngas. Identical conditions as above were assumed, and carbon recovery of 90±1% was maintained.

Figure 8:
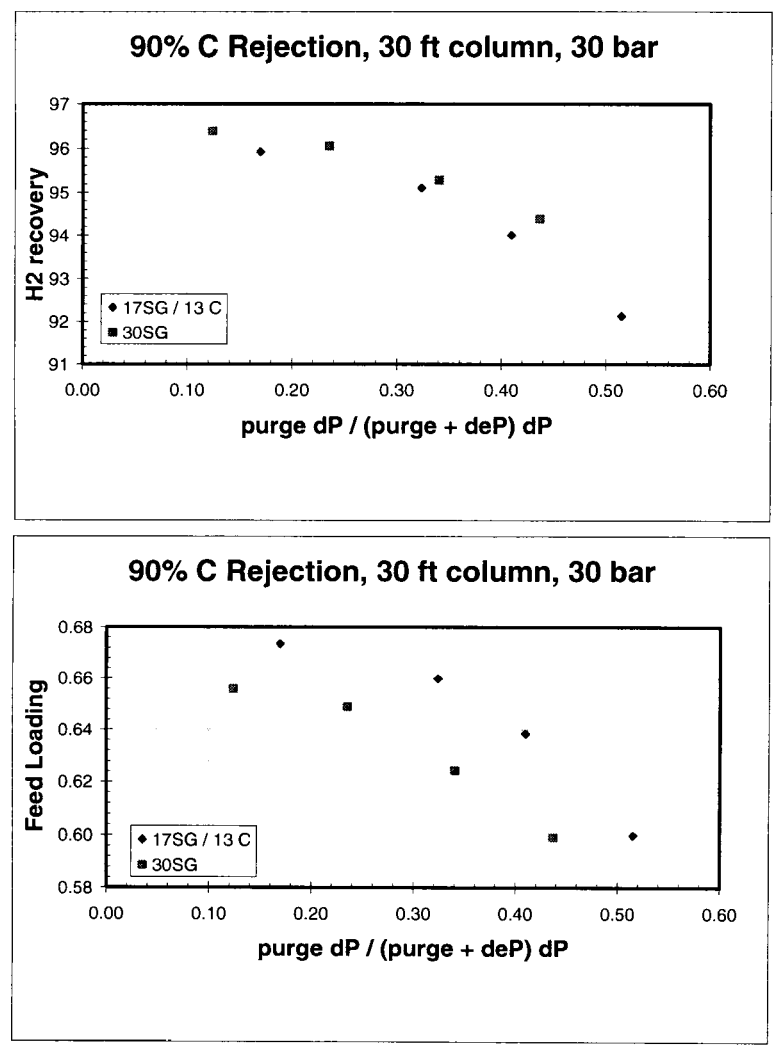
FIG. 8 shows plots of the hydrogen recovery percentage against the amount of purge gas used in scenarios described below.

The $H_2$ recovery and feed productivity are plotted in FIG. 8. For a given purge parameter, the PSA process with silica gel-only yields slightly higher $H_2$ recovery (up to ½ pt) with a 5-7% lower feed productivity compared to the process of Example 7.

An advantage of this approach is elimination of all adsorbents that are potentially sensitive to high $H_2S$ exposure (carbon, zeolite). This process would be much easier to operate than one based on mixed layer beds as one does not need to worry about limiting the $H_2S$ exposure to the second layer of adsorbent. It will be beneficial to adopt this strategy when the potential for adsorbent degradation are severe, e.g. with first time units or processes with varying feed $H_2S$ levels or flow rates.

Partial adsorbent replacement is also much simpler with an all silica gel process. Adsorbent in the feed section of the adsorber is more likely to need periodic replacement as it is contacted with all components of the sour feed gas, whereas the product end bed sees a more or less typical syngas composition. Since the entire bed is silica gel, provisions may be made within the vessels to permit removal of a bottom fraction of adsorbent (e.g., the lowest 5 ft (1.5 m) of the bed). Silica gel in upper portions of the bed would fall by gravity to lower layers as the bottom fraction is removed. Fresh silica gel can then be added to the top of the beds to complete the partial adsorbent exchange. This approach is not feasible in a bed containing multiple layers of adsorbent.

Example 9

In this set of simulations bed loadings of 1) 17' (5.2 m) high purity silica gel and 13' (4 m) carbon and 2) 30' (9.2 m) high purity silica gel were used. The results are plotted in FIG. 9. Process parameters were kept the same as in the previous simulations, and 90% carbon rejection was maintained. $N_2$ was used to purge the adsorber beds rather than some of the product gas.

Figure 9:
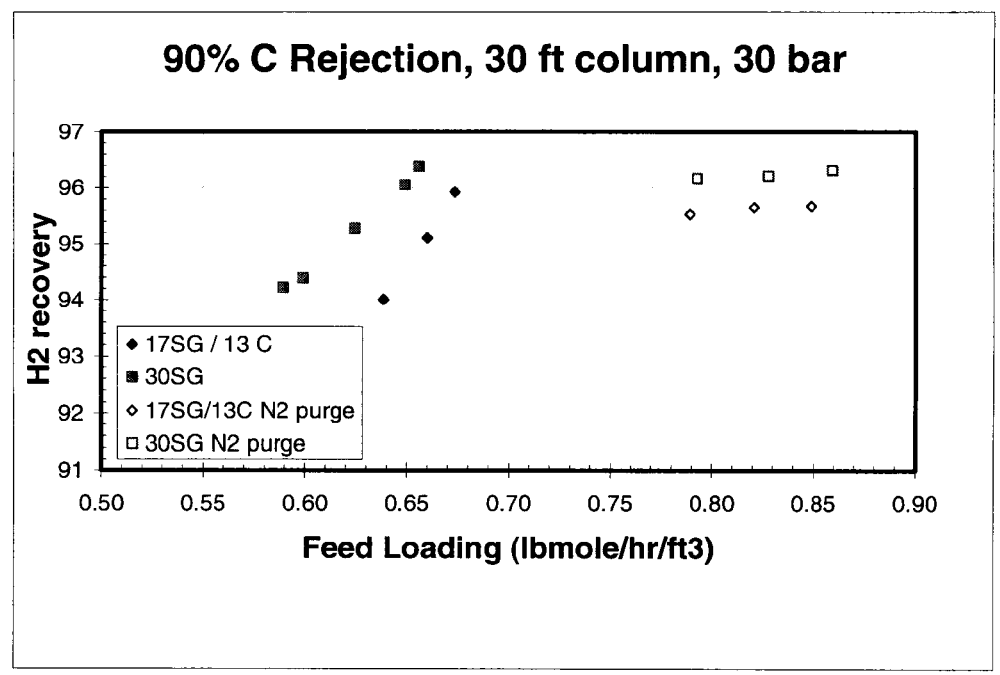
FIG. 9 shows a plot of the hydrogen recovery percentage against feed productivity in scenarios described below.

Using an $N_2$ purge introduces higher levels of $N_2$ in the $H_2$ product—the $H_2$ level drops from 88-89% to 81-84%, and the inert gas content (Ar+$N_2$) increases from 2 to 8-10%. Even so, further dilution of the $H_2$ product would be required before introduction to the turbine (typically $H_2$ is limited to 50%), so this product gas composition from the PSA is acceptable. The big advantage of using the $N_2$ purge is illustrated in FIG. 9—much higher feed loadings are achieved (at high $H_2$ recovery) than obtained for the 'product gas purge' processes. Smaller, lower cost adsorber vessels are then possible for a given feed gas flow.

In this specification, unless expressly otherwise indicated, the word 'or' is used in the sense of an operator that returns a true value when either or both of the stated conditions is met, as opposed to the operator 'exclusive or' which requires that only one of the conditions is met. The word 'comprising' is used in the sense of 'including' rather than in to mean 'consisting of'. All prior teachings acknowledged above are hereby incorporated by reference. No acknowledgement of any prior published document herein should be taken to be an admission or representation that the teaching thereof was common general knowledge in Australia or elsewhere at the date hereof. In so far as they are not incompatible, preferred features of the invention as described above may be used in any combination.

The invention claimed is:

1. Apparatus for use in purifying hydrogen by removal of impurities from a hydrogen feed gas, said apparatus comprising a flow path for said feed gas containing a first adsorbent in a first adsorbent vessel for adsorbing hydrogen sulfide, said flow path having a feed direction, a second adsorbent in a second adsorbent vessel for adsorbing at least carbon dioxide in said flow path downstream in said feed direction from said first adsorbent vessel, a source of at least one regeneration gas, a regeneration controller for at first intervals directing a regeneration gas from said source of regeneration gas to regenerate said first adsorbent, and for at second intervals directing a regeneration gas from said source of regeneration gas to regenerate said second adsorbent, wherein said first adsorbing is silica gel, titania, or a cross-linked resin having no ionic groups and no hydrogen sulfide reactive functional groups.

* * * * *